United States Patent
Bernetich et al.

(10) Patent No.: US 10,661,487 B2
(45) Date of Patent: May 26, 2020

(54) PARTICULATE-BINDER COMPOSITE ARTICLE AND ASSOCIATED SYSTEM AND METHOD FOR MANUFACTURING THE SAME

(71) Applicant: The Boeing Company, Chicago, IL (US)

(72) Inventors: Karl R. Bernetich, Wilmington, DE (US); Robert R. Ignatuk, Thornton, PA (US); James W. Kohlbrenner, Prospect Park, PA (US)

(73) Assignee: The Boeing Company, Chicago, IL (US)

( * ) Notice: Subject to any disclaimer, the term of this patent is extended or adjusted under 35 U.S.C. 154(b) by 471 days.

(21) Appl. No.: 15/364,402

(22) Filed: Nov. 30, 2016

(65) Prior Publication Data

US 2018/0147757 A1    May 31, 2018

(51) Int. Cl.

| | |
|---|---|
| *B29C 45/18* | (2006.01) |
| *B29C 45/00* | (2006.01) |
| *B64C 27/00* | (2006.01) |
| *B22F 3/22* | (2006.01) |
| *C22C 32/00* | (2006.01) |
| *B29K 63/00* | (2006.01) |
| *B29K 505/00* | (2006.01) |
| *B29L 31/08* | (2006.01) |

(52) U.S. Cl.
CPC ............ *B29C 45/0013* (2013.01); *B22F 3/22* (2013.01); *B29C 45/18* (2013.01); *B64C 27/008* (2013.01); *C22C 32/0094* (2013.01); *B22F 2999/00* (2013.01); *B29K 2063/00* (2013.01); *B29K 2505/00* (2013.01); *B29L 2031/082* (2013.01)

(58) Field of Classification Search
CPC ......... B29C 70/00; B29C 70/58; B29C 31/04; B29C 2037/96; B29C 39/003; B29C 39/02; B29C 39/24
USPC .................................................. 264/241, 299
See application file for complete search history.

(56) References Cited

U.S. PATENT DOCUMENTS

| | | | |
|---|---|---|---|
| 4,078,422 A | 3/1978 | Brunsch et al. | |
| 4,320,079 A * | 3/1982 | Minnear | ............. B29C 37/0064 249/62 |
| 5,041,321 A * | 8/1991 | Bendig | ..................... B32B 5/26 428/102 |
| 5,273,398 A | 12/1993 | Reinfelder et al. | |

(Continued)

OTHER PUBLICATIONS

European Patent Office, "Extended Search Report," App. No. 17203698.0 (dated May 8, 2018).

*Primary Examiner* — Christina A Johnson
*Assistant Examiner* — Xue H Liu
(74) *Attorney, Agent, or Firm* — Walters & Wasylyna LLC

(57) ABSTRACT

A system for manufacturing a particulate-binder composite article including a mold defining a mold cavity, a first opening into the mold cavity, and a second opening into the mold cavity, a mass of a particulate material received in the mold cavity, a binder source in selective fluid communication with the mold cavity by way of the first opening, the binder source including a binder material, a first filter disposed across the first opening, the first filter being permeable to the binder material and substantially impermeable to the particulate material, and a second filter disposed across the second opening, the second filter being permeable to air and substantially impermeable to the particulate material.

20 Claims, 4 Drawing Sheets

(56) References Cited

U.S. PATENT DOCUMENTS

| | | | |
|---|---|---|---|
| 5,686,676 | A | 11/1997 | Jech et al. |
| 5,842,108 | A | 11/1998 | Kim et al. |
| 6,048,379 | A | 4/2000 | Bray et al. |
| 6,525,125 | B1 | 2/2003 | Giardello et al. |
| 6,914,032 | B2 | 7/2005 | Kim et al. |
| 7,051,783 | B1 | 5/2006 | Bojilov et al. |
| 7,172,725 | B2 | 2/2007 | Hong et al. |
| 2005/0281701 | A1 | 12/2005 | Lynch et al. |
| 2010/0072662 | A1* | 3/2010 | Wang ................ C08J 3/205 |
| | | | 264/241 |

* cited by examiner

PARTICULATE-BINDER COMPOSITE ARTICLE AND ASSOCIATED SYSTEM AND METHOD FOR MANUFACTURING THE SAME

FIELD

This application relates to particulate-binder composites, such as metal powder-binder composites, and more particularly, to systems and methods for manufacturing particulate-binder composite articles.

BACKGROUND

Rotorcraft, such as helicopters, employ rotor blades to generate lift. Specifically, rotorcraft typically include a mast that is coupled to a power plant (e.g., a jet engine and transmission assembly), and the rotor blades are coupled to the mast by way of a rotor hub. Rotation of the mast about a mast axis causes corresponding rotation of the rotor blades about the mast axis, thereby generating lift.

In modern rotorcraft, the weight of each rotor blade is balanced to reduce vibration as the rotor blades rotate about the mast axis. Balancing of a rotor blade is commonly achieved by introducing and properly positioning one or more tuning weights into the body of the rotor blade, such as along the leading edge of the rotor blade and proximate (at or near) the outboard end of the rotor blade. Such tuning weights are formed from high-density materials. For example, tungsten is commonly used to form such tuning weights.

Tungsten is a brittle metal with a relatively high Young's modulus. Particulate-binder composites, such as tungsten powder-binder composites, offer a relatively lower Young's modulus and, therefore, have been explored as alternatives to tungsten metal for use in tuning weights for rotor blades. However, traditional techniques for forming tungsten powder-binder composite articles, such as high-shear mixing under vacuum followed by casting, are cumbersome and fail to adequately approximate the density of tungsten.

Accordingly, those skilled in the art continue with research and development efforts in the field of particulate-binder composites.

SUMMARY

In one example, the disclosed system for manufacturing a particulate-binder composite article may include a mold defining a mold cavity, a first opening into the mold cavity, and a second opening into the mold cavity, a mass of a particulate material received in the mold cavity, a binder source in selective fluid communication with the mold cavity by way of the first opening, the binder source including a binder material, a first filter disposed across the first opening, the first filter being permeable to the binder material and substantially impermeable to the particulate material, and a second filter disposed across the second opening, the second filter being permeable to air and substantially impermeable to the particulate material.

In one example, the disclosed method for manufacturing a particulate-binder composite article may include steps of (1) placing a mass of a particulate material into a mold cavity of a mold, the mold defining a first opening into the mold cavity and a second opening into the mold cavity, (2) positioning a first filter across the first opening, the first filter being substantially impermeable to the particulate material, (3) positioning a second filter across the second opening, the second filter being permeable to air and substantially impermeable to the particulate material, and (4) injecting a binder material into the mold cavity by way of the first opening, the first filter being permeable to the binder material.

In one example, the disclosed particulate-binder composite article may be a tuning weight for a rotor blade of a rotorcraft. For example, the particulate-binder composite article may be formed from a metal powder-binder composite, such as a tungsten powder-binder composite.

Other examples of the disclosed particulate-binder composite article and associated system and method for manufacturing the same will become apparent from the following detailed description, the accompanying drawings and the appended claims.

DETAILED DESCRIPTION

Disclosed are systems and methods for manufacturing a particulate-binder composite article, such as a metal powder-binder composite article (e.g., a tungsten powder-binder composite article). Without being limited to any particular theory, it is believed that the disclosed systems and methods are capable of manufacturing particulate-binder composite articles having higher densities than can be achieved using traditional techniques because, as disclosed, the particulate material is placed into a mold prior to binder infusion, thereby ensuring a higher packing efficiency of the particulate material.

Figure 1:
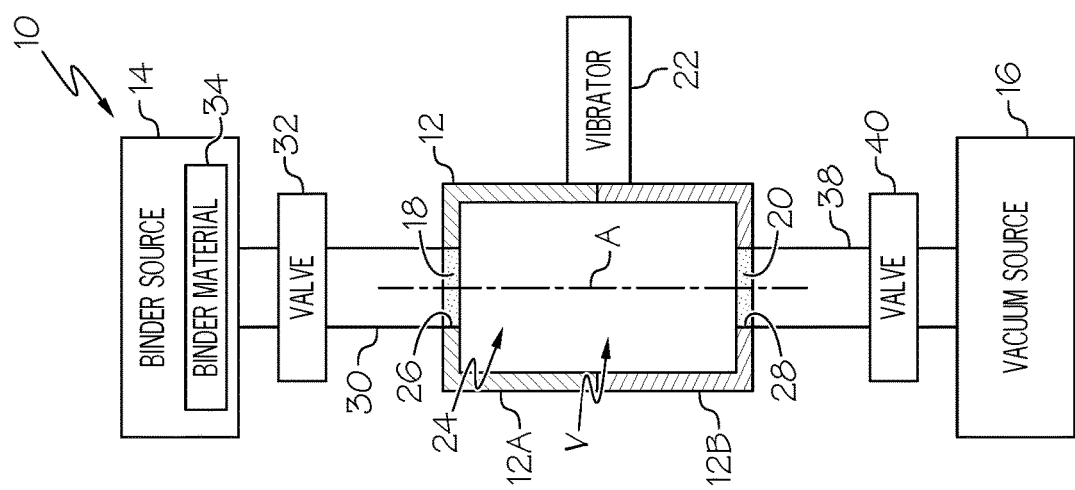
FIG. 1 is a schematic representation of one example of the disclosed system for manufacturing a particulate-binder composite article.

Referring to FIG. 1, one example of the disclosed system for manufacturing a particulate-binder composite article, generally designated 10, may include a mold 12, a binder source 14, a vacuum source 16, a first filter 18 and a second filter 20. A vibrator 22 may optionally be vibrationally coupled with the mold 12. Additional (or fewer) components may be included in the disclosed system 10 without departing from the scope of the present disclosure.

The mold 12 of the disclosed system 10 may define a mold cavity 24 having a predefined volume. In one particular construction, the mold 12 may be a two-part mold that includes a first (e.g., upper) mold member 12A and a second (e.g., lower) mold member 12B. The first mold member 12A may be releasably connected (e.g., with a clamp, bolts or the like) to the second mold member 12B to define the mold cavity 24. Compositionally, the mold 12 may be constructed from various materials, with consideration being given to operating temperatures and pressures.

The size and shape of the mold 12, particularly the size and shape of the mold cavity 24, may widely vary. Those skilled in the art will appreciate that the size and shape of the mold cavity 24 may be dictated by the desired size and shape of the articles to be manufactured by the system 10.

The mold 12 may define a first opening 26 and a second opening 28. The first opening 26 may be formed in the first mold member 12A, and may function as an inlet port. The second opening 28 may be formed in the second mold member 12B, and may function as an exit port. To facilitate such inlet/exit port functionality, the first opening 26 may be generally opposed from the second opening 28, such as longitudinally opposed vis-à-vis a longitudinal axis A of the mold 12.

The binder source 14 of the disclosed system 10 may be in selective fluid communication with the mold cavity 24 by way of a supply line 30, a valve 32 and the first opening 26 in the mold 12. The binder source 14 may contain a quantity of binder material 34. Therefore, when the valve 32 is in an open configuration, binder material 34 may flow (see arrow $F_1$ in FIG. 3) from the binder source 14, through the supply line 30 and, ultimately, into the mold cavity 24 of the mold 12 by way of the first opening 26. As one non-limiting example, the binder source 14 may be a holding tank (or other vessel), and the binder material 34 may flow from the binder source 14 to the mold cavity 24 under the force of gravity. As another non-limiting example, the binder source 14 may be a holding tank (or other vessel), and the binder material 34 may move from the binder source 14 to the mold cavity 24 by way of a pump (not shown).

The binder material 34 may be any fluid capable of flowing from the binder source 14 to the mold cavity 24 as described herein, and which forms a particulate-binder composite article upon contacting a suitable particulate material 36 (FIGS. 2 and 3) and subsequent curing. While certain polymeric materials are described herein, various binder materials 34 (including non-polymeric materials) may be used without departing from the scope of the present disclosure.

In one particular implementation, the binder material 34 may be a thermosetting polymer. General examples of suitable thermosetting polymers include, but are not limited to, epoxy resins, cyanate esters, vinylesters, polyesters, bismaleimide, polyurethanes, melamine resins and the like. Use of other thermosetting polymers is also contemplated.

In another particular implementation, the binder material 34 may be a low viscosity thermosetting polymer. As one specific, non-limiting example, the binder material 34 may be PRISM® EP2450, a low viscosity one-part epoxy resin commercially available from Cytec Solvay Group of Woodland Park, N.J. As another specific, non-limiting example, the binder material 34 may be API 1078, a low viscosity two-part epoxy resin commercially available from Applied Poleramic Inc. of Benicia, Calif.

As used herein, a "low viscosity" thermosetting polymer binder material 34 may have a viscosity of at most about 100 centipoise. In one expression, the viscosity of the thermosetting polymer binder material 34 may be at most about 90 centipoise. In another expression, the viscosity of the thermosetting polymer binder material 34 may be at most about 80 centipoise. In another expression, the viscosity of the thermosetting polymer binder material 34 may be at most about 70 centipoise. In another expression, the viscosity of the thermosetting polymer binder material 34 may be at most about 60 centipoise. In yet another expression, the viscosity of the thermosetting polymer binder material 34 may be at most about 50 centipoise.

The vacuum source 16 of the disclosed system 10 may be in selective fluid communication with the mold cavity 24 by way of a supply line 38, a valve 40 and the second opening 28 in the mold 12. The vacuum source 16 may be a vacuum pump, an aspirator or the like. Therefore, when the valve 40 is in an open configuration, a vacuum may be drawn within the mold cavity 24, as shown by arrow $F_2$ in FIG. 3.

In one alternative example, the vacuum source 16 may be omitted from the system 10. Rather than drawing a vacuum in the mold cavity 24 by way of the second opening 28, the second opening 28 may be opened to the surrounding atmosphere (e.g., ambient air).

Figure 2:
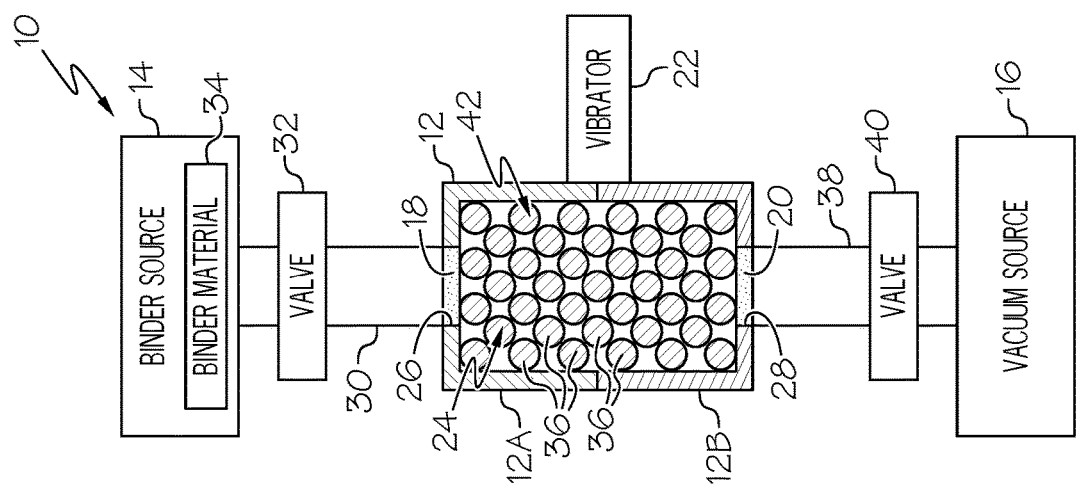
FIG. 2 is a schematic representation of the system of FIG. 1 shown with particulate material loaded into a mold.

Referring to FIG. 2, a mass 42 of particulate material 36 may be received in the mold cavity 24 of the mold 12. The particulate material 36 may substantially fill the volume V of the mold cavity 24.

The particulate material 36 may be various particles that, when contacted by the binder material 34 and the binder material 34 is cured, form a particulate-binder composite article. While metallic powders are described herein, various particulate material 36 (including non-metallic materials, such as ceramic materials and polymeric materials) may be used without departing from the scope of the present disclosure.

In one particular implementation, the particulate material 36 may be a metallic powder. As one specific, non-limiting example, the particulate material 36 may be tungsten powder, such as tungsten powder having a purity of 99+ percent (e.g., 99.9 percent pure tungsten). Use of other metallic powders, such as pure metal powders (e.g., lead powder; bismuth powder) and/or metal alloy powders, as well as mixtures of different metallic powders, is also contemplated.

The particles of the particulate material 36 may be spheroidized. For example, the particulate material 36 may be spheroidized tungsten powder. However, the shapes of the particles of the particulate material 36 may vary without departing from the scope of the present disclosure. Furthermore, while the particles of the particulate material 36 may be solid, the use of hollow particles is also contemplated.

The particle size distribution of the particulate material 36 may be a design consideration. Using finer/smaller particulate material 36 may result in greater particle packing efficiency and, therefore, particulate-binder composite articles with higher densities. However, finer/smaller particulate material 36 may be more difficult to handle and contain within the mold 12. In one expression, the particulate material 36 may have an average particle size of at most about 50 microns. In another expression, the particulate material 36 may have an average particle size of at most about 40 microns. In another expression, the particulate material 36 may have an average particle size of at most about 30 microns. In yet another expression, the particulate material 36 may have an average particle size ranging from about 15 microns to about 30 microns. For example, the particulate material 36 may be spheroidized tungsten powder having an average particle size of about 27 microns.

Referring to FIG. 2, the vibrator 22 of the disclosed system 10 may be vibrationally coupled with the mold 12. When a mass 42 of particulate material 36 is placed into the mold cavity 24 of the mold 12, the vibrator 22 may be actuated, thereby causing the mold 12 and particulate material 36 to vibrate. Without being limited to any particular theory, it is believed that vibrating the particulate material 36 prior to introducing the binder material 34 may further improve the packing efficiency of the particulate material 36 and, thus, result in particulate-binder composite articles with higher densities.

Still referring to FIG. 2, the first filter 18 of the disclosed system 10 may be disposed across the first opening 26 in the mold 12. The first filter 18 may have a pore size with a magnitude sufficient to contain the particulate material 36 within the mold cavity 24 (the particulate material 36 generally cannot pass through the first filter 18), while allowing the binder material 34 to pass through the first filter 18. Various filter media, such as glass microfiber filters and the like, may be used, provided the required pore size is available.

The required pore size of the first filter 18 will depend on, among other possible factors, the average particle size of the particulate material 36 and the composition of the binder material 34. For example, when the binder material 34 is a low viscosity epoxy resin (e.g., PRISM® EP2400) and the particulate material 36 is a spheroidized tungsten powder having an average particle size of about 27 microns (e.g., OSRAM tungsten powder commercially available from OSRAM GmbH of Munich, Germany), the first filter 18 may be a glass microfiber filter having a 0.7-micron pore size (e.g., WHATMAN™ 1825-047 commercially available from GE Healthcare of Little Chalfont, United Kingdom). As another example, the first filter 18 may be a microfiber filter having a pore size ranging from about 0.4 micron to about 1 micron.

The second filter 20 of the disclosed system 10 may be disposed across the second opening 28 in the mold 12. The second filter 20 may have a pore size with a magnitude sufficient to contain both the binder material 34 and the particulate material 36 within the mold cavity 24 (neither the binder material nor the particulate material 36 pass through the second filter 20), while allowing air to pass through the second filter 20. Various filter media, such as membrane filters (e.g., polytetrafluoroethylene membrane filter; polyethersulfone membrane filters; etc.), glass microfiber filters and the like, may be used, provided the required pore size is available.

The required pore size of the second filter 20 will depend on, among other possible factors, the average particle size of the particulate material 36 and the composition of the binder material 34. For example, when the binder material 34 is a low viscosity epoxy resin (e.g., PRISM® EP2400) and the particulate material 36 is a spheroidized tungsten powder having an average particle size of about 27 microns (e.g., OSRAM tungsten powder), the second filter 20 may be a polytetrafluoroethylene membrane filter having a 0.2-micron pore size (e.g., WHATMAN™ 6874-2502 commercially available from GE Healthcare). As another example, the second filter 20 may be a membrane filter having a pore size ranging from about 0.1 micron to about 0.5 micron.

Figure 3:
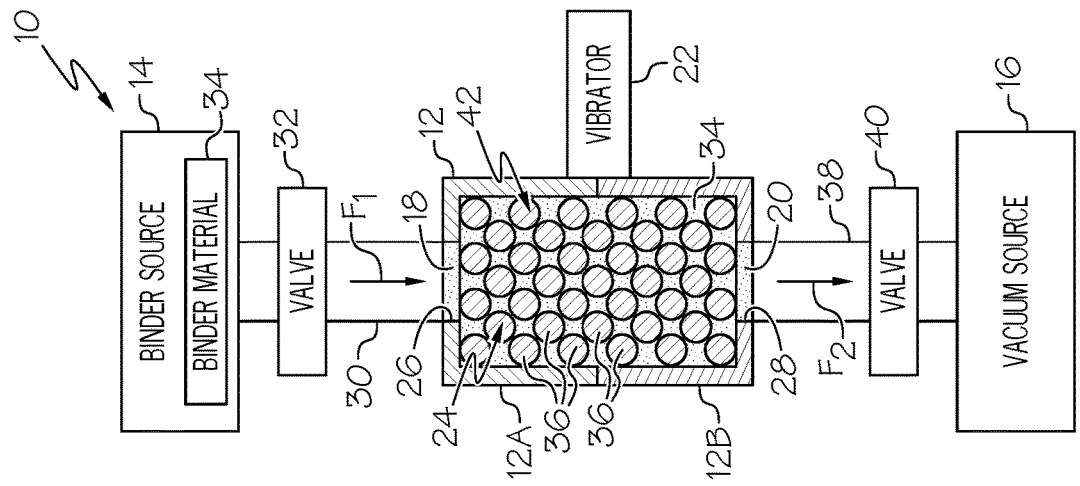
FIG. 3 is schematic representation of the system of FIG. 2 shown with binder material infused into the particulate material in the mold.

Referring now to FIG. 3, with the mass 42 of particulate material 36 received in the mold cavity 24 of the mold 12, a particulate-binder composite article may be formed by opening both valves 32, 40. Upon opening the valves 32, 40, a vacuum is drawn within the mold cavity 24 (through the second filter 20) as the binder material 34 flows from the binder source 14 (through the first filter 18) to the mold cavity 24. Since the first filter 18 is substantially impermeable to the particulate material 36 and the second filter 20 is substantially impermeable to both the particulate material 36 and the binder material 34, the mass 42 of particulate material 36 is contained within the mold cavity 24 and becomes infused with the binder material 34. A quantity of binder material 34 sufficient to fill the voids within the mass 42 of particulate material 36 is all that is required. Once cured, the resulting particulate-binder composite article may be removed from the mold 12.

Figure 4:
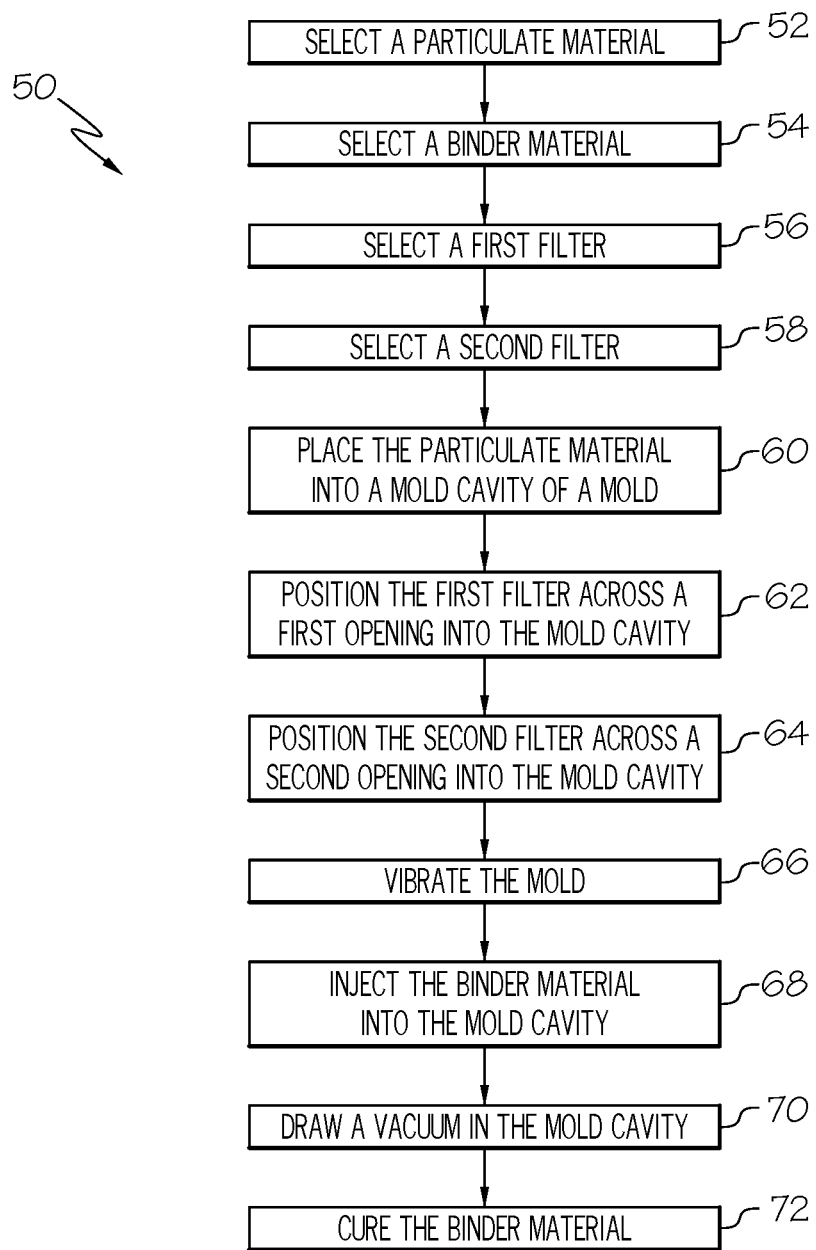
FIG. 4 is a flow diagram depicting one example of the disclosed method for manufacturing a particulate-binder composite article.

Referring to FIG. 4, one example of the disclosed method for manufacturing a particulate-binder composite article, generally designated 50, may begin at Blocks 52, 54, 56, 58 with material selection. At Block 52, a particulate material 36 may be selected. At Block 54, a binder material 34 may be selected. At Block 56, a first filter 18 may be selected. At Block 58, a second filter 20 may be selected. As noted herein, selection of the first filter 18 and the second filter 20 may include consideration of the type of particulate material 36 and binder material 34 selected.

At Block 60, a mass 42 of the particulate material 36 may be placed into the mold cavity 24 of a mold 12. The mold 12 may include a first opening 26 and a second opening 28, both providing access to the mold cavity 24.

At Block 62, the first filter 18 may be positioned across the first opening 26 in the mold 12. The first filter 18 may allow the binder material 34 to pass therethrough, but may be substantially impermeable to the particulate material 36.

At Block 64, the second filter 20 may be positioned across the second opening 28 in the mold 12. The second filter 20 may allow air to pass therethrough, but may be substantially impermeable to both the binder material 34 and the particulate material 36. With both the first and second filters 18, 20 in position, the particulate material 36 may be contained within the mold cavity 24 of the mold 12.

At Block 66, the mold 12 may be vibrated. Vibrating the mold 12, while optional, may improve the packing efficiency of the particulate material 36 contained within the mold 12.

At Block 68, the binder material 34 may be injected into the mold cavity 24 of the mold 12. Because the first and second filters 18, 20 contain the particulate material 36 within the mold 12, injection of the binder material 34 fills the voids within the mass 42 of particulate material 36.

At Block 70, a vacuum may be drawn within the mold cavity 24 of the mold 12. While Block 70 is shown after Block 68, the step of drawing a vacuum (Block 70) may also be performed before and/or during the injecting step (Block 68). The vacuum may promote infusion of the binder material 34 by drawing the binder material 34 into the mass 42 of particulate material 36.

At Block 72, the binder material 34 may be cured. The curing technique (e.g., heat, electromagnetic radiation, or the like) will depend on the chemistry of the binder material 34. Once the binder material 34 has been cured, the resulting particulate-binder composite article may be removed from the mold 12.

Figure 5:
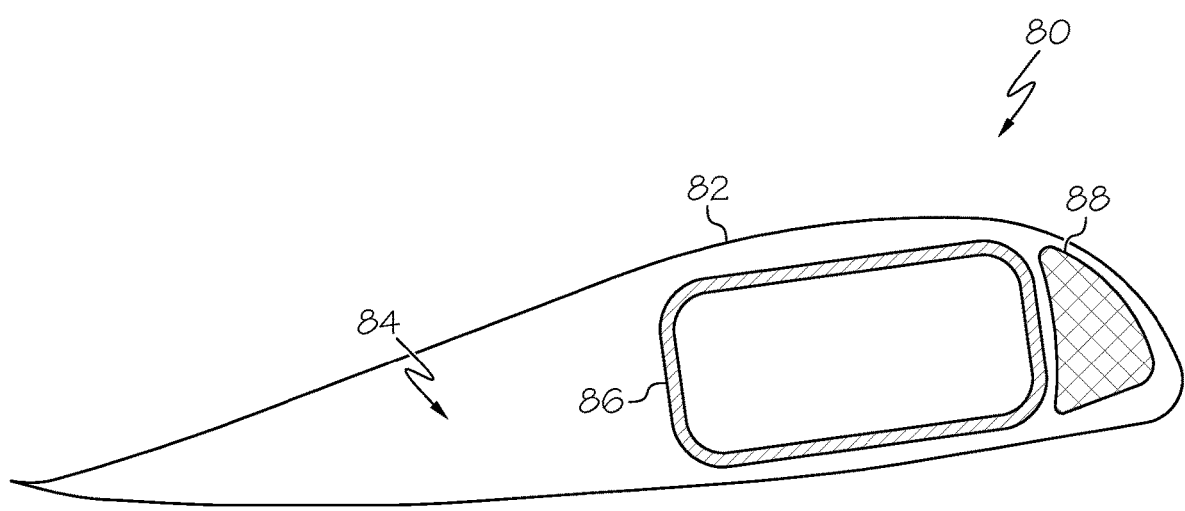
FIG. 5 is a cross-sectional view of a rotor blade of a rotorcraft incorporating a tuning weight formed from the method of FIG. 4.
Figure 7:
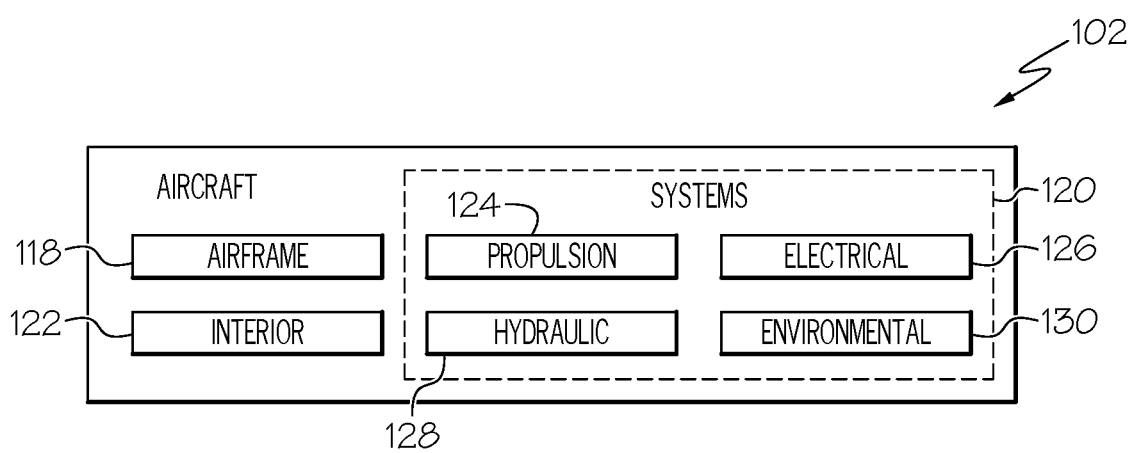
FIG. 7 is a block diagram of an aircraft.

Referring to FIG. 5, also disclosed is a rotor blade 80 for an aircraft, such as aircraft 102 shown in FIG. 7, which may be a rotorcraft (e.g., a helicopter). The rotor blade 80 may include a fairing 82 that defines an internal volume 84. Within the internal volume 84 may be a spar 86 and a tuning weight 88. The tuning weight 88 may be positioned against (or in close proximity to) the spar 86. The tuning weight 88 may be formed by the method 50 shown in FIG. 4.

Figure 6:
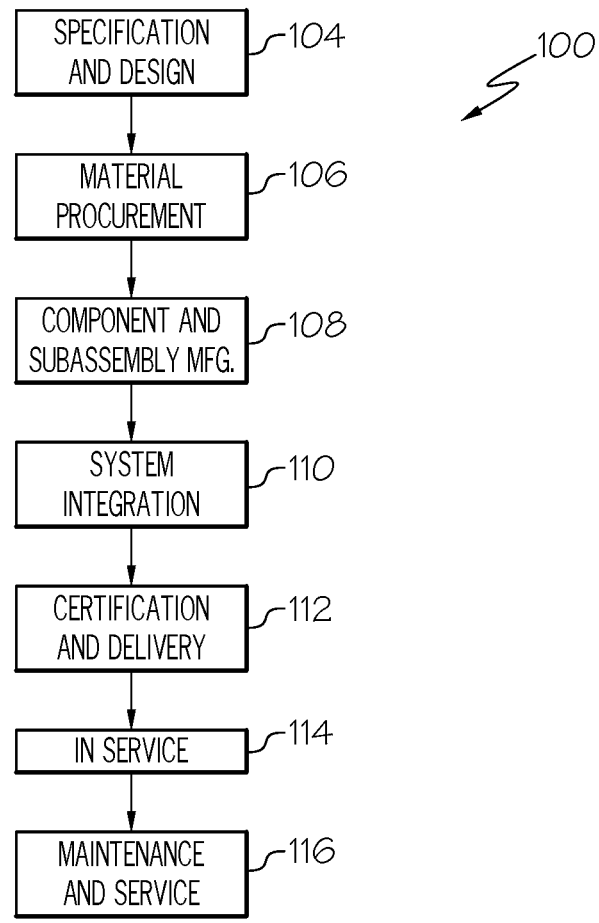
FIG. 6 is a flow diagram of an aircraft manufacturing and service methodology.

Examples of the disclosure may be described in the context of an aircraft manufacturing and service method 100, as shown in FIG. 6, and an aircraft 102, as shown in FIG. 7. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included.

The disclosed particulate-binder composite article and associated system and method for manufacturing the same may be employed during any one or more of the stages of the aircraft manufacturing and service method 100. As one example, components or subassemblies corresponding to component/subassembly manufacturing 108, system integration 110, and or maintenance and service 116 may be fabricated or manufactured using the disclosed particulate-binder composite article and associated system and method for manufacturing the same. As another example, the airframe 118 may be constructed using the disclosed particulate-binder composite article and associated system and method for manufacturing the same. Also, one or more apparatus examples, method examples, or a combination thereof may be utilized during component/subassembly manufacturing 108 and/or system integration 110, for example, by substantially expediting assembly of or reducing the cost of an aircraft 102, such as the airframe 118 and/or the interior 122. Similarly, one or more of system examples, method examples, or a combination thereof may be utilized while the aircraft 102 is in service, for example and without limitation, to maintenance and service 116.

The disclosed particulate-binder composite article and associated system and method for manufacturing the same is described in the context of an aircraft (e.g., a rotorcraft, such as a helicopter); however, one of ordinary skill in the art will readily recognize that the disclosed particulate-binder composite article and associated system and method for manufacturing the same may be utilized for a variety of applications. For example, the disclosed particulate-binder composite article and associated system and method for manufacturing the same may be implemented in various types of vehicle including, for example, passenger ships, automobiles, marine products (boat, motors, etc.) and the like.

Although various examples of the disclosed particulate-binder composite article and associated system and method for manufacturing the same have been shown and described, modifications may occur to those skilled in the art upon reading the specification. The present application includes such modifications and is limited only by the scope of the claims.

What is claimed is:

1. A method for manufacturing a particulate-binder composite article, said method comprising:

placing a mass of a particulate material into a mold cavity of a mold, said mold defining a first opening into said mold cavity and a second opening into said mold cavity;

positioning a first filter across said first opening, said first filter being substantially impermeable to said particulate material;

positioning a second filter across said second opening, said second filter being permeable to air and substantially impermeable to said particulate material; and after said mass of said particulate material has been placed into said mold cavity, injecting a binder material into said mold cavity by way of said first opening, said first filter being permeable to said binder material.

2. The method of claim 1 further comprising selecting a tungsten powder as said particulate material.

3. The method of claim 2 wherein selecting said tungsten powder comprises selecting a tungsten powder comprising an average particle size of at most about 30 microns.

4. The method of claim 1 further comprising selecting as said binder material a thermosetting polymer having a viscosity of at most about 100 centipoise.

5. The method of claim 1 further comprising selecting an epoxy resin as said binder material.

6. The method of claim 1 further comprising selecting as said second filter a filter that is substantially impermeable to said binder material.

7. The method of claim 1 further comprising drawing a vacuum in said mold cavity by way of said second opening.

8. The method of claim 1 further comprising applying vibration to said mold prior to said step of injecting said binder material.

9. The method of claim 1 further comprising selecting a spheroidized tungsten powder as said particulate material.

10. The method of claim 1 further comprising selecting a metallic powder as said particulate material.

11. The method of claim 10 wherein selecting said metallic powder comprises selecting a metallic powder comprising an average particle size of at most about 40 microns.

12. The method of claim 10 wherein selecting said metallic powder comprises selecting a metallic powder comprising an average particle size between about 15 microns and about 30 microns.

13. The method of claim 1 further comprising selecting as said binder material a thermosetting polymer.

14. The method of claim 1 further comprising selecting as said binder material a thermosetting polymer having a viscosity of at most about 80 centipoise.

15. The method of claim 1 wherein said first opening is longitudinally opposed from said second opening.

16. The method of claim 1 further comprising, after said binder material has been injected into said mold cavity, curing said binder material to yield said particulate-binder composite article.

17. The method of claim 16 further comprising removing said particulate-binder composite article from said mold after said binder material has been cured.

18. A method for manufacturing a particulate-binder composite article, said method comprising:

placing a mass of spheroidized tungsten powder into a mold cavity of a mold, said mold defining a first opening into said mold cavity and a second opening into said mold cavity, said spheroidized tungsten powder comprising an average particle size between about 15 microns and about 30 microns;

positioning a first filter across said first opening, said first filter being substantially impermeable to said mass of spheroidized tungsten powder;

positioning a second filter across said second opening, said second filter being permeable to air and substantially impermeable to said mass of spheroidized tungsten powder;

after said mass of spheroidized tungsten powder has been placed into said mold cavity, applying vibration to said mold;

after said mass of spheroidized tungsten powder has been placed into said mold cavity, injecting a thermosetting polymer into said mold cavity by way of said first opening, said first filter being permeable to said thermosetting polymer; and curing said thermosetting polymer.

19. The method of claim 18 wherein said thermosetting polymer has a viscosity of at most about 100 centipoise.

20. The method of claim 18 wherein said thermosetting polymer comprises epoxy resin.

* * * * *